United States Patent
Zeng

(10) Patent No.: US 9,857,651 B2
(45) Date of Patent: Jan. 2, 2018

(54) ARRAY SUBSTRATE AND LIQUID CRYSTAL DEVICE

(71) Applicant: Shenzhen China Star Optoelectronics Technology Co., Ltd., Shenzhen, Guangdong (CN)

(72) Inventor: Mian Zeng, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/905,588

(22) PCT Filed: Dec. 21, 2015

(86) PCT No.: PCT/CN2015/097997
§ 371 (c)(1),
(2) Date: Jul. 17, 2017

(87) PCT Pub. No.: WO2017/092082
PCT Pub. Date: Jun. 8, 2017

(65) Prior Publication Data
US 2017/0307948 A1  Oct. 26, 2017

(30) Foreign Application Priority Data
Dec. 2, 2015  (CN) .......................... 2015 1 0876144

(51) Int. Cl.
G02F 1/1362  (2006.01)
G02F 1/1335  (2006.01)
(Continued)

(52) U.S. Cl.
CPC ...... G02F 1/136286 (2013.01); G02F 1/1368 (2013.01); G02F 1/133514 (2013.01); G09G 3/3614 (2013.01)

(58) Field of Classification Search
CPC ......... G02F 1/136286; G02F 1/133514; G02F 2001/136222; G02F 2201/52;
(Continued)

(56) References Cited

U.S. PATENT DOCUMENTS 8,432,345 B2 * 4/2013 Asano .................. G09G 3/3233
345/88
8,970,564 B2 * 3/2015 Moon .................. G09G 3/3648
345/204

(Continued)

*Primary Examiner* — Jian Pan
(74) *Attorney, Agent, or Firm* — Andrew C. Cheng

(57) ABSTRACT

The present invention propose an array substrate and a liquid crystal display device. The array substrate includes data lines and scan lines and a plurality of red, green and blue sub-pixels. The data lines and scan lines run across but not touching each other. The red, green and blue sub-pixels are lined in parallel along the data lines. Each sub-pixel connects corresponding scan line and data line via a thin film transistor. Each pixel area is installed with at least one sub-pixel, and scan lines forming two neighboring pixel areas are different. The two neighboring sub-pixels have opposite polarity, and sub-pixels lined horizontally along the scan lines have the same color. The present invention requires the fewer number of data lines, saving the cost of the array substrate. The present invention also saves the layout room on the array substrate, reduces non-transparent areas, and increases aperture ratio.

9 Claims, 3 Drawing Sheets

(51) Int. Cl.
*G02F 1/1368* (2006.01)
*G09G 3/36* (2006.01)

(58) Field of Classification Search
CPC ............... G02F 1/1368; G09G 3/2003; G09G 2300/0452; G09G 3/3607; G09G 3/3611; G09G 5/02; G09G 3/3614; G09G 3/3648; G02B 5/201; H01L 27/322; H01L 27/3213
See application file for complete search history.

(56) References Cited

U.S. PATENT DOCUMENTS

| | | | |
|---|---|---|---|
| 9,570,020 B2* | 2/2017 | Yoo | G09G 3/3607 |
| 2007/0097072 A1* | 5/2007 | Kim | G09G 3/3614 345/103 |
| 2008/0068516 A1* | 3/2008 | Mori | G09G 3/3648 348/790 |
| 2011/0285950 A1* | 11/2011 | Su | G02F 1/136286 349/139 |
| 2013/0135183 A1* | 5/2013 | Kimura | G09G 3/3241 345/76 |
| 2015/0379947 A1* | 12/2015 | Sang | G09G 3/3614 349/37 |
| 2015/0380435 A1* | 12/2015 | Li | G09G 3/3614 349/43 |
| 2016/0027396 A1* | 1/2016 | Li | G09G 3/3614 345/212 |

* cited by examiner

ARRAY SUBSTRATE AND LIQUID CRYSTAL DEVICE

BACKGROUND OF THE INVENTION

1. Field of the Invention

The present invention relates to the field of liquid crystal display (LCD), and more specifically, to an array substrate and LCD device.

2. Description of the Prior Art

In the field of display technology, flat-panel display device such as LCD and organic light emitting diode (OLED) has gradually replaced cathode ray tube (CRT) display device and been applied extensively to LCD TVs, mobile phones, personal digital assistants (PDA), digital cameras, computer screens and notebook screens. An important component of LCDs or OLEDs is a display panel.

Be it a display panel of LCD or OLED, a display panel usually has a thin film transistor (TFT) array substrate. The TFT array substrate is formed with a plurality of red (R), green (G) and blue (B) sub-pixels arranged in arrays, and a plurality of scan lines and data lines. Each sub-pixel receives scan signals and data signals via its respective scan line and data line, so to display images.

Please refer to FIG. 1. FIG. 1 is a structure diagram of an array substrate formed by conventional technology. The array substrate comprises a plurality of data lines, vertically arranged and parallel to each other, such as D1, D2, D3, D4 and D5 in FIG. 1; a plurality of scan lines, horizontally arranged and parallel to each other, such as G1, G2, G3, and G4 in FIG. 1; and sub-pixels arranged in arrays. Each sub-pixel in the same row is electrically connected to a scan line above the row through a TFT. For example, each sub-pixel in the first row are electrically connected to scan line G1 via a TFT, each sub-pixel in the second row are electrically connected to scan line G2 via a TFT, and so on and so forth. Each sub-pixel in the same column is electrically connected to a data line in the left of the column through a TFT. For example, each sub-pixel in the first column is electrically connected to data line D1 via a TFT, each sub-pixel in the second column are electrically connected to data line D2 via a TFT, and so on and so forth.

However, the regular connection method mentioned above requires a large layout room on the array substrate, occupies areas covered by a photoshield, and lowers the aperture ratio of the display device. With the method, the utilization rate of data lines and scan lines are low. It wastes resources and increases the production cost of the display device.

SUMMARY OF THE INVENTION

An object of the present invention is to provide an array substrate and LCD device, which not only lowers the number of data lines and production cost, but also saves the layout room and further reduces the area covered by a photoshield and improves the aperture ratio of pixels.

According to the present invention, an array substrate comprises a plurality of data lines and scan lines and a plurality of red (R), green (G) and blue (B) sub-pixels. The plurality of data lines and scan lines run across but not touching each other. The plurality of red (R), green (G) and blue (B) sub-pixels are lined in parallel along the data lines. Each sub-pixel connects corresponding scan line and data line via a thin film transistor (TFT). Each pixel area is installed with at least one sub-pixel, and scan lines forming two neighboring pixel areas are different. The two neighboring sub-pixels have opposite polarity, and sub-pixels lined horizontally along the scan lines have the same color.

Furthermore, each pixel area is installed with two sub-pixels lined in parallel along data lines, and each sub-pixel is connected to its corresponding scan line and data line via its corresponding TFT; two neighboring sub-pixels lined in parallel along the scan lines connect to different data lines.

Furthermore, the data lines are used to output column inversion driving data or row inversion driving data.

Furthermore, only one sub-pixel is installed in each of the pixel areas in odd columns and two sub-pixels lined in parallel along the scan lines are installed in each of the pixel areas in even columns, with each sub-pixel connected to its corresponding scan line via its corresponding TFT; two neighboring sub-pixels lined in parallel along scan lines connect to different scan lines, and two neighboring sub-pixels opposite to each other across a data line connect to the same data line.

According to the present invention, an array substrate comprises a plurality of data lines and scan lines and a plurality of red (R), green (G) and blue (B) sub-pixels. The plurality of data lines and scan lines run across but not touching each other. The plurality of red (R), green (G) and blue (B) sub-pixels are lined in parallel along the data lines. Each sub-pixel connects corresponding scan line and data line via a thin film transistor (TFT). Each pixel area is installed with at least one sub-pixel, and scan lines forming two neighboring pixel areas are different.

Furthermore, each pixel area is installed with two sub-pixels lined in parallel along data lines, and each sub-pixel is connected to its corresponding scan line and data line via its corresponding TFT; two neighboring sub-pixels lined in parallel along the scan lines connect to different data lines.

Furthermore, the data lines are used to output column inversion driving data or row inversion driving data.

Furthermore, only one sub-pixel is installed in each of the pixel areas in odd columns and two sub-pixels lined in parallel along the scan lines are installed in each of the pixel areas in even columns, with each sub-pixel connected to its corresponding scan line via its corresponding TFT; two neighboring sub-pixels lined in parallel along scan lines connect to different scan lines, and two neighboring sub-pixels opposite to each other across a data line connect to the same data line.

Furthermore, the two neighboring sub-pixels have opposite polarity.

Furthermore, sub-pixels lined horizontally along the scan lines have the same color.

Furthermore, the TFT comprises a drain electrically connected to the sub-pixels, a gate electrically connected to the corresponding scan line, and a source electrically connected to the corresponding data line.

According to the present invention, a liquid crystal display (LCD) device, comprises an array substrate, a color film substrate disposed opposite to the array substrate, and liquid crystal molecules sandwiched between the array substrate and color film substrate. The array substrate comprises a plurality of data lines and scan lines and a plurality of red (R), green (G) and blue (B) sub-pixels. The plurality of data lines and scan lines run across but not touching each other. The plurality of red (R), green (G) and blue (B) sub-pixels are lined in parallel along the data lines. Each sub-pixel connects corresponding scan line and data line via a thin film transistor (TFT). Each pixel area is installed with at least one sub-pixel, and scan lines forming two neighboring pixel areas are different.

Furthermore, the data lines are used to output column inversion driving data or row inversion driving data.

Furthermore, only one sub-pixel is installed in each of the pixel areas in odd columns and two sub-pixels lined in parallel along the scan lines are installed in each of the pixel areas in even columns, with each sub-pixel connected to its corresponding scan line via its corresponding TFT; two neighboring sub-pixels lined in parallel along scan lines connect to different scan lines, and two neighboring sub-pixels opposite to each other across a data line connect to the same data line.

Furthermore, the two neighboring sub-pixels have opposite polarity.

Furthermore, sub-pixels lined horizontally along the scan lines have the same color.

Furthermore, the TFT comprises a drain electrically connected to the sub-pixels, a gate electrically connected to the corresponding scan line, and a source electrically connected the corresponding data line.

Different from conventional technology, a plurality of data lines and a plurality of scan lines of an array substrate of a present embodiment run across but do not touch each other, and form pixel areas. The present embodiment further comprises a plurality of RGB sub-pixels lined in parallel along the data lines. Comparing with the conventional technology with which RGB sub-pixels lined along the scan lines, the present embodiment requires only one-third of the number of data lines, saving the cost of two-thirds of the data lines, and therefore significantly reduces the cost of the array substrate. Each sub-pixel connects to its corresponding scan line and data line through a TFT. Each pixel area is installed with at least one sub-pixel, and the scan lines that form two neighboring pixel areas are different. It means that at least two scan lines are deployed between any two neighboring pixel areas lined along a data line. It saves the layout room on the array substrate, reduces non-transparent areas, and increases aperture ratio.

DETAILED DESCRIPTION OF PREFERRED EMBODIMENTS

An array substrate of a present embodiment comprises a plurality of data lines and a plurality of scan lines, which run across but do not touch each other, and form a plurality of pixel areas. In a preferred embodiment, all data lines are in parallel and all scan lines are in parallel, whereas data lines and scan lines are perpendicular to each other. No limitation as such is applied to the present embodiment. Furthermore, the array substrate comprises a plurality of RGB sub-pixels lined in parallel with data lines. Each sub-pixel electrically connects its corresponding scan line and data line via a TFT. Each pixel area is installed with at least one sub-pixel, and the scan lines forming any two neighboring pixel areas are not the same.

Figure 2:
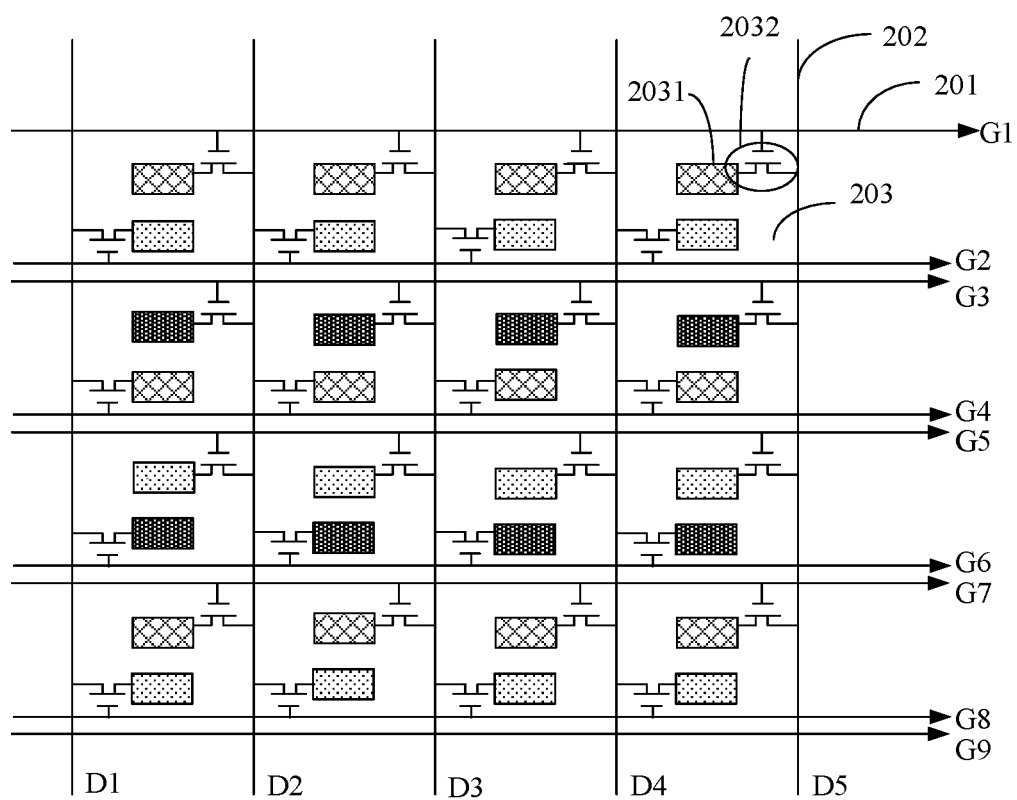
FIG. 2 is a structure diagram of an array substrate according to a preferred embodiment of the present invention.

Please refer to FIG. 2 for specific description. FIG. 2 is a structure diagram of the array substrate of an embodiment of the present invention. In the present embodiment, scan lines 201 and data lines 202 run across but do not touch each other, forming a plurality of pixel areas 203. A plurality of RGB sub-pixels 2031 lines along the data line 202. Sub-pixels 2031 that lined horizontally along a scan line 201 are of the same color. Two neighboring sub-pixels 2031 are of opposite polarity. Comparing with conventional technology which arranges sub-pixels along scan lines, the present embodiment requires only one-third of the number of data lines as RGB sub-pixels line along data lines 202. Although it means that the number of scan lines 201 must increase accordingly, chip on film (COF) on the side of the scan lines 201 is a lot cheaper than COF on the side of the data lines 202. In addition, in other embodiments, scan lines 201 can even installed on the substrate directly without COF. Therefore, RGB sub-pixels 2031 lining along data lines 202 can significantly reduce the cost of the array substrate.

As shown in FIG. 2, scan lines 201 forming two neighboring pixel areas 203 are different, meaning that the two neighboring pixel areas 203 lined along the data line 202 do not share a same scan line 201. At least two scan lines 201 are deployed between any two neighboring pixel areas 203 lined along the data line 202. The arrangement saves deployment space on the array substrate, reduces non-transparent areas and increases the aperture ratio.

Each pixel area 203 is installed with two sub-pixels 2031 lined in parallel with a data line. Each sub-pixel 2031 connects its respective scan line 201 and data line 202 via its respective TFT 2032. The TFT 2032 comprises a drain electrically connected to the sub-pixel 2031, a gate electrically connected to the scan line 201, and a source electrically connected to the data line 202. In a preferred embodiment, each sub-pixel 2031 connects the scan line 201 and data line 202 that are closest to it. For example, two scan lines 201 are deployed between two neighboring pixel areas 203 in the present embodiment. The sub-pixels 2031 deployed opposite to each other across the two scan lines 201 connect to the one closest to themselves respectively. In addition, neighboring sub-pixels 2031 lined in parallel with the scan line 201 connect different data lines 202. For example, assume that there are two sub-pixels 2031 lined in parallel with the data line 202, with data lines arranged horizontally and scan lines vertically, as shown in FIG. 2. The sub-pixel 2031 on the upper part connects the data line 202 on the right of the pixel area 203, and the sub-pixel 2031 on the lower part connects the data line 202 on the left of the pixel area 203. It means that sub-pixels 2031 in odd rows and sub-pixels 2031 in even rows line alternately. When sub-pixels 2031 are arranged in arrays, sub-pixels 2031 of the same order number in the neighboring rows connect two neighboring data lines 202 respectively. Neighboring data lines provide different voltages, and when data lines 202 output column inversion data, dot inversion can be realized. The method not only saves the tremendous energy consumed by dot inversion, lowers the cost of the array substrate, and delivers good display effect brought by dot inversion, enhancing display quality.

The horizontal deployment of scan lines 201 and vertical deployment of data lines 202 are relative. When the direction of the array substrate changes, the positions of scan lines 201 and data lines 202 change accordingly. Therefore, when the position of the array substrate turns 90 degrees or the viewing angle of users turns 90 degrees, the horizontal and vertical deployment switches accordingly. The column inversion becomes a row inversion, but its nature or effect does not change. No limitation as such is imposed here.

Different from conventional technology, a plurality of data lines and a plurality of scan lines of an array substrate of a present embodiment run across but do not touch each other, and form pixel areas. The present embodiment further comprises a plurality of RGB sub-pixels lined in parallel along the data lines. Comparing with the conventional technology with which RGB sub-pixels lined along the scan lines, the present embodiment requires only one-third of the number of data lines, saving the cost of two-thirds of the data lines, and therefore significantly reduces the cost of the array substrate. Each sub-pixel connects to its corresponding scan line and data line through a TFT. Each pixel area is installed with at least one sub-pixel, and the scan lines that form two neighboring pixel areas are different. It means that at least two scan lines are deployed between any two neighboring pixel areas lined along a data line. It saves the layout room on the array substrate, reduces non-transparent areas, and increases aperture ratio. In addition, the two sub-pixels lined in parallel along a data line in each pixel area connect to their corresponding scan lines and data lines via their corresponding TFTs respectively. The two neighboring sub-pixels lined in parallel along a scan line connect to different data lines, with neighboring data lines providing different voltages. When data lines output column inversion data, dot inversion can be realized. It not only saves the tremendous energy consumed by dot inversion, lowers the cost of the array substrate, but also delivers good display effect brought by dot inversion, enhancing display quality.

Figure 3:
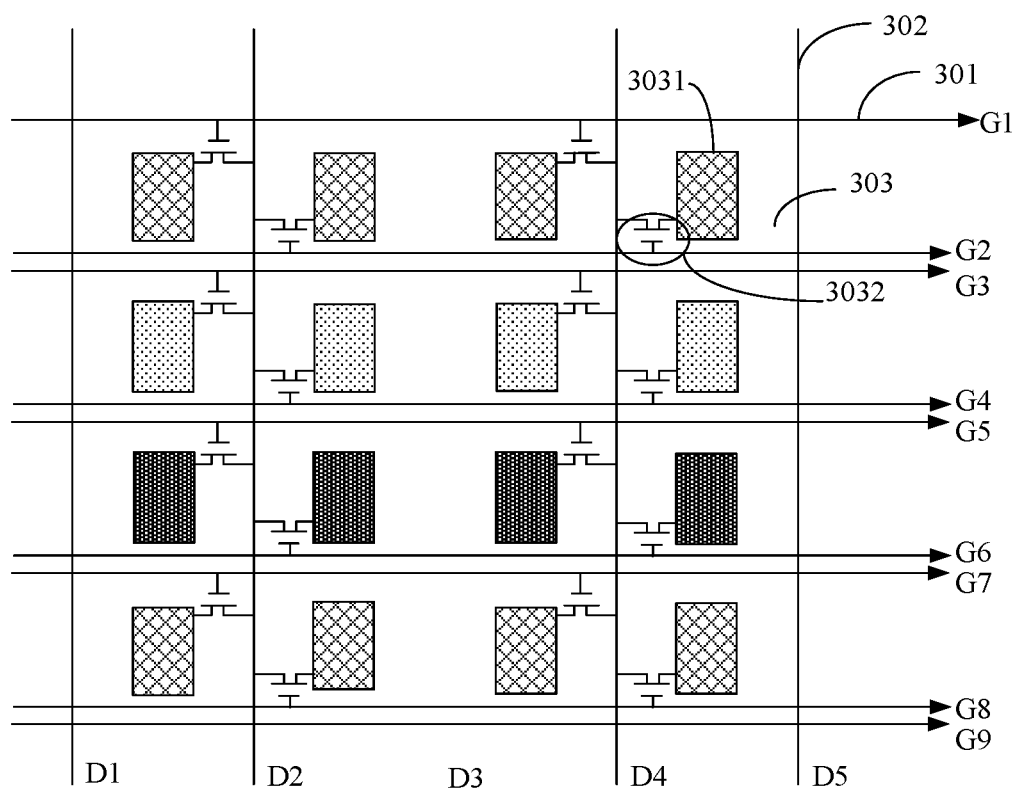
FIG. 3 is a structure diagram of an array substrate according to another preferred embodiment of the present invention.

Please refer to FIG. 3. FIG. 3 is a structure diagram of an array substrate of another embodiment of the present invention. The scan lines 301 and data lines 302 of the array substrate of the present embodiment run across but do not touch each other, forming a plurality of pixel areas 303. A plurality of sub-pixels RGB 3031 line along the data line 302. Sub-pixels 3031 lined horizontally along the scan line 301 are of the same color, and two neighboring sub-pixels 3031 are of opposite polarity. Comparing with conventional technology which arranges RGB sub-pixels along data lines 302, the present embodiment requires only one-third of the number of data lines as RGB sub-pixels line along scan lines. Although it means that the number of scan lines 301 must increase accordingly, COF on the side of the scan lines 301 is a lot cheaper than COF on the side of the data lines 302. In addition, in other embodiments, scan lines 301 can even installed on the substrate directly without COF. Therefore, RGB sub-pixels 3031 lining along data lines 302 can significantly reduce the cost of the array substrate.

As shown in FIG. 3, scan lines 301 forming two pixel areas 303 are different, meaning that the two neighboring pixel areas 303 lined along the data line 302 do not share a same scan line 301. At least two scan lines 301 are deployed between any two neighboring pixel areas 303 lined along the data line 302. The arrangement saves deployment space on the array substrate, reduces non-transparent areas and increases the aperture ratio.

In the present embodiment, scan lines 301 line horizontally and data lines 302 line vertically. A sub-pixel 3031 is installed in the pixel area 303 situated in odd columns on the array substrate. Two sub-pixels 3031 are installed in parallel along scan lines 301 in the pixel area 303 situated in even columns on the array substrate. Each sub-pixel 3031 connects its corresponding scan line via its respective TFT 3032.

The TFT 3032 comprises a drain electrically connected to the sub-pixel 3031, a gate electrically connected to the scan line 301, and a source electrically connected to the data line 302. In addition, two neighboring sub-pixels 3031 lined in parallel along the scan line 301 connect to different scan lines 301. For example, two scan lines 301 are deployed between two pixel areas 303 lined along two data lines 302. Sub-pixels 3031 in odd rows and sub-pixels 3031 in even rows deployed opposite to each other across the two scan lines 301 connect to the scan line that is closest to them respectively.

Figure 1:
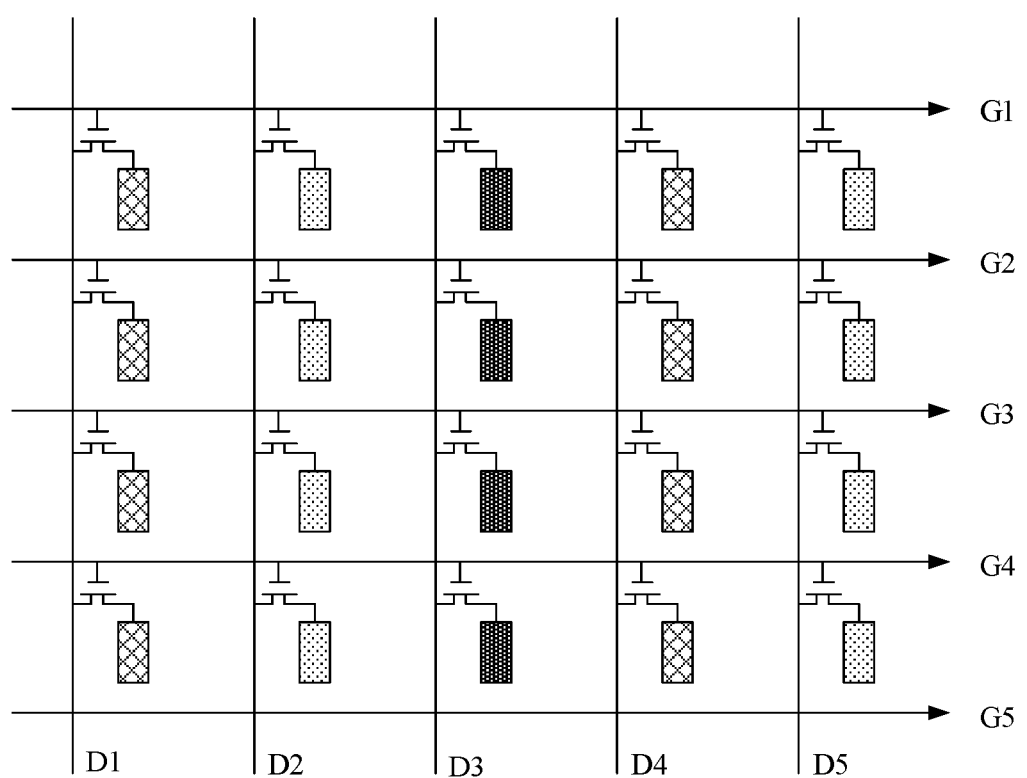
FIG. 1 shows a structure diagram of a conventional array substrate.

The two neighboring sub-pixels 3031 that are opposite to each other across the data line 302 connect to the same data line 302. Comparing with conventional technology that connects each sub-pixel in a row to a different data line, the present embodiment saves half of the data lines. It means that comparing with conventional technology shown in FIG. 1, the array substrate of the present embodiment only requires one-sixth of the data lines, saving five-sixths of the data lines and significantly reduces the production cost of the array substrate.

Different from conventional technology, a plurality of data lines and a plurality of scan lines of an array substrate of a present embodiment run across but do not touch each other, and form pixel areas. The present embodiment further comprises a plurality of RGB sub-pixels lined in parallel along the data lines. Comparing with the conventional technology with which RGB sub-pixels lined along the scan lines, the present embodiment requires only one-third of the number of data lines, saving the cost of two-thirds of the data lines, and therefore significantly reduces the cost of the array substrate. Each sub-pixel connects to its corresponding scan line and data line through a TFT. Each pixel area is installed with at least one sub-pixel, and the scan lines that form two neighboring pixel areas are different. It means that at least two scan lines are deployed between any two neighboring pixel areas lined along a data line. It saves the layout room on the array substrate, reduces non-transparent areas, and increases aperture ratio. Moreover, the cost of the array substrate can be lowered even more, as the number of data lines can be further halved when two neighboring pixel areas opposite to each other across a data line connect to the same data line.

Figure 4:
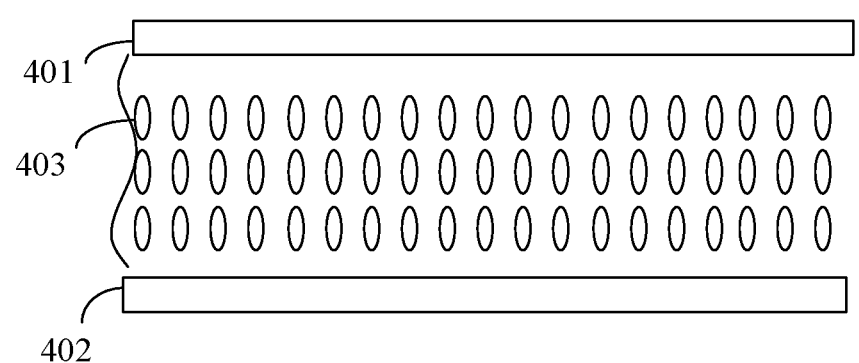
FIG. 4 is a structure diagram of a liquid crystal display device according to a preferred embodiment of the present invention.

Please refer to FIG. 4. FIG. 4 is a structure diagram of an embodiment of a LCD device of the present invention. The LCD device of the present embodiment comprises an array substrate 401, a color film substrate 402, and liquid crystal molecules 403 that are sandwiched between the array substrate and the color film substrate. The array substrate comprises a plurality of data lines and scan lines. The data lines and scan lines run across but do not touch each other, forming a plurality of pixel areas. In a preferred embodiment, all data lines are in parallel and all scan lines are in parallel, whereas data lines and scan lines are perpendicular to each other. No such limitation is applied in the present embodiment. Furthermore, the array substrate comprises a plurality of RGB sub-pixels. The RGB pixels line in parallel with data lines, and each RGB pixel electrically connects its corresponding scan line and data line via a TFT. Each pixel area is installed with at least one sub-pixel, and the scan lines forming two neighboring pixel areas are not the same.

In one of the embodiments, two sub-pixels lined in parallel along the data lines are installed in each pixel area. Each sub-pixel connects its corresponding scan line and data line via its corresponding TFT respectively. Two neighboring sub-pixels lined in parallel along scan lines connect to different data lines. No such limitation is imposed here. Please refer to FIG. 2 and corresponding description for specifics.

Different from conventional technology, a plurality of data lines and a plurality of scan lines of an array substrate of a present embodiment run across but do not touch each other, and form pixel areas. The present embodiment further comprises a plurality of RGB sub-pixels lined in parallel along the data lines. Comparing with the conventional technology with which RGB sub-pixels lined along the scan lines, the present embodiment requires only one-third of the number of data lines, saving the cost of two-thirds of the data lines, and therefore significantly reduces the cost of the array substrate. Each sub-pixel connects to its corresponding scan line and data line through a TFT. Each pixel area is installed with at least one sub-pixel, and the scan lines that form two neighboring pixel areas are different. It means that at least two scan lines are deployed between any two neighboring pixel areas lined along a data line. It saves the layout room on the array substrate, reduces non-transparent areas, and increases aperture ratio. In addition, the two sub-pixels lined in parallel along a data line in each pixel area connect to their corresponding scan lines and data lines via their corresponding TFTs respectively. The two neighboring sub-pixels lined in parallel along a scan line connect to different data lines, with neighboring data lines providing different voltages. When data lines output column inversion data, dot inversion can be realized. It not only saves the tremendous energy consumed by dot inversion, lowers the cost of the array substrate, but also delivers good display effect brought by dot inversion, enhancing display quality.

In another embodiment, only one sub-pixel is installed in pixel areas of odd columns, and two sub-pixels lined in parallel along the scan line are installed in each of the pixel areas of even columns. Each sub-pixel connects its corresponding scan line and data line via its corresponding TFT respectively. Two neighboring sub-pixels lined in parallel along the scan line connect to different scan lines. Two neighboring sub-pixels situated opposite across a data line connect to the same data line. No further explanation is provided here. Please refer to FIG. 3 and corresponding description for more specifics.

Different from conventional technology, a plurality of data lines and a plurality of scan lines of an array substrate of a present embodiment run across but do not touch each other, and form pixel areas. The present embodiment further comprises a plurality of RGB sub-pixels lined in parallel along the data lines. Comparing with the conventional technology with which RGB sub-pixels lined along the scan lines, the present embodiment requires only one-third of the number of data lines, saving the cost of two-thirds of the data lines, and therefore significantly reduces the cost of the array substrate. Each sub-pixel connects to its corresponding scan line and data line through a TFT. Each pixel area is installed with at least one sub-pixel, and the scan lines that form two neighboring pixel areas are different. It means that at least two scan lines are deployed between any two neighboring pixel areas lined along a data line. It saves the layout room on the array substrate, reduces non-transparent areas, and increases aperture ratio. Moreover, the cost of the array substrate can be lowered even more, as the number of data lines can be further halved when two neighboring pixel areas opposite to each other across a data line connect to the same data line.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. An array substrate, comprising:
a plurality of data lines and scan lines, running across but not touching each other; and a plurality of red (R), green (G) and blue (B) sub-pixels, lined in parallel along the data lines; each sub-pixel connects corresponding scan line and data line via a thin film transistor (TFT); each pixel area is installed with at least one sub-pixel, and scan lines forming two neighboring pixel areas are different,
wherein the two neighboring sub-pixels have opposite polarity, and sub-pixels lined horizontally along the scan lines is of the same color,
wherein only one sub-pixel is installed in each of the pixel areas in odd columns and two sub-pixels lined in parallel along the scan lines are installed in each of the pixel areas in even columns, with each sub-pixel connected to its corresponding scan line via its corresponding TFT; two neighboring sub-pixels lined in parallel along scan lines connect to different scan lines, and two neighboring sub-pixels opposite to each other across a data line connect to the same data line.

2. An array substrate, comprising:
a plurality of data lines and scan lines, running across but not touching each other; and a plurality of red (R), green (G) and blue (B) sub-pixels, lined in parallel along the data lines; each sub-pixel connects corresponding scan line and data line via a thin film transistor (TFT); each pixel area is installed with at least one sub-pixel, and scan lines forming two neighboring pixel areas are different,
wherein only one sub-pixel is installed in each of the pixel areas in odd columns and two sub-pixels lined in parallel along the scan lines are installed in each of the pixel areas in even columns, with each sub-pixel connected to its corresponding scan line via its corresponding TFT; two neighboring sub-pixels lined in parallel along scan lines connect to different scan lines, and two neighboring sub-pixels opposite to each other across a data line connect to the same data line.

3. The array substrate of claim 2, wherein the two neighboring sub-pixels have opposite polarity.

4. The array substrate of claim 2, wherein sub-pixels lined horizontally along the scan lines have the same color.

5. The array substrate of claim 2, wherein the TFT comprises a drain electrically connected to one of the sub-pixels, a gate electrically connected to the corresponding scan line, and a source electrically connected to the corresponding data line.

6. A liquid crystal display (LCD) device, comprising:
an array substrate;
a color film substrate disposed opposite to the array substrate; and
liquid crystal molecules sandwiched between the array substrate and the color film substrate; wherein the array substrate comprises:
a plurality of data lines and scan lines, running across but not touching each other; a plurality of red (R), green (G) and blue (B) sub-pixels, lined in parallel along the data lines; each sub-pixel connects corresponding scan line and data line via a thin film transistor (TFT); each pixel area is installed with at least one sub-pixel, and scan lines forming two neighboring pixel areas are different, wherein only one sub-pixel is installed in each of the pixel areas in odd columns and two sub-pixels lined in parallel along the scan lines are installed in each of the pixel areas in even columns, with each sub-pixel connected to its corresponding scan line via its corresponding TFT; two neighboring sub-pixels lined in parallel along scan lines connect to different scan lines, and two neighboring sub-pixels opposite to each other across a data line connect to the same data line.

7. The LCD device of claim 6, wherein the two neighboring sub-pixels have opposite polarity.

8. The LCD device of claim 6, wherein sub-pixels lined horizontally along the scan lines have the same color.

9. The LCD device of claim 6, wherein the TFT comprises a drain electrically connected to one of the sub-pixels, a gate electrically connected to the corresponding scan line, and a source electrically connected to the corresponding data line.

* * * * *